United States Patent
Park et al.

(10) Patent No.: US 8,927,167 B2
(45) Date of Patent: Jan. 6, 2015

(54) FUEL CELL SYSTEM AND DRIVING METHOD THEREOF

(75) Inventors: Jun-Young Park, Suwon-si (KR);
Jin-Hwa Lee, Suwon-si (KR);
Seong-Jin An, Suwon-si (KR);
Chi-Seung Lee, Suwon-si (KR);
Jun-Won Suh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 567 days.

(21) Appl. No.: 12/541,109

(22) Filed: Aug. 13, 2009

(65) Prior Publication Data
US 2010/0136377 A1    Jun. 3, 2010

Related U.S. Application Data

(60) Provisional application No. 61/119,670, filed on Dec. 3, 2008.

(51) Int. Cl.
*H01M 8/04* (2006.01)
*H01M 8/10* (2006.01)

(52) U.S. Cl.
CPC ...... *H01M 8/04753* (2013.01); *H01M 8/04231* (2013.01); *H01M 8/0488* (2013.01); *Y02E 60/50* (2013.01)
USPC .......................................... 429/430; 429/444

(58) Field of Classification Search
CPC ............ H01M 8/04; H01M 8/04802–8/04216; H01M 8/04298; H01M 8/0438–8/04432; H01M 8/04537–8/04626; H01M 8/04746–8/04753
USPC ......................... 429/400, 428–432, 443–446
See application file for complete search history.

(56) References Cited

U.S. PATENT DOCUMENTS

| | | | |
|---|---|---|---|
| 6,773,837 B1 * | 8/2004 | Kai et al. | 429/430 |
| 2004/0115495 A1 * | 6/2004 | Asai et al. | 429/22 |
| 2004/0137292 A1 * | 7/2004 | Takebe et al. | 429/23 |
| 2004/0157093 A1 * | 8/2004 | Mardilovich et al. | 429/13 |

(Continued)

FOREIGN PATENT DOCUMENTS

| | | |
|---|---|---|
| CN | 101292384 A | 10/2008 |
| DE | 11 2006 002 715 T5 | 9/2008 |
| JP | 08-007911 | 1/1996 |
| JP | 2003-100324 | 4/2003 |
| JP | 2005-183354 | 7/2005 |

(Continued)

OTHER PUBLICATIONS

Krumbach, *Systemanalyse und Betriebsführung eines Brennstoffzellen-BHKW*, Jan. 19, 2006, Universitat Ulm, Dissertation, Ulm, XP-002570177, pp. 78-103; figures 2.29, 3.4; tables 3.2-3.4.

(Continued)

*Primary Examiner* — Jonathan Crepeau
*Assistant Examiner* — Jacob Buchanan
(74) *Attorney, Agent, or Firm* — Christie, Parker & Hale, LLP

(57) ABSTRACT

A method of driving a fuel cell system according to embodiments of the present invention includes supplying a first amount of oxidizer (which is less than a normal amount of oxidizer) to a fuel cell stack while continuously supplying fuel to the fuel cell stack, supplying a second amount of oxidizer (which is more than the normal amount) to the fuel cell stack, and supplying a third amount of oxidizer (which is the normal amount of oxidizer supplied in a normal driving state) to the fuel cell stack.

8 Claims, 5 Drawing Sheets

(56) References Cited

U.S. PATENT DOCUMENTS

| | | | |
|---|---|---|---|
| 2004/0161647 A1* | 8/2004 | Rainville et al. | 429/25 |
| 2005/0096858 A1* | 5/2005 | Okuda | 702/63 |
| 2007/0048557 A1* | 3/2007 | Sinha | 429/13 |
| 2009/0110981 A1* | 4/2009 | Saito et al. | 429/22 |
| 2009/0269628 A1 | 10/2009 | Imanishi et al. | |

FOREIGN PATENT DOCUMENTS

| | | | |
|---|---|---|---|
| JP | 2006-185750 | 7/2006 | |
| JP | 2006-318808 | 11/2006 | |
| JP | 2007-287674 | 1/2007 | |
| KR | 10-2004-0004473 | 1/2004 | |
| KR | 10-2004-0015012 | 2/2004 | |
| KR | 10-2008-0053400 | 6/2008 | |
| WO | WO 2007/024390 A1 | 3/2007 | |
| WO | WO 2007043548 A1 * | 4/2007 | H01M 8/04 |

OTHER PUBLICATIONS

European Search Report dated Mar. 8, 2010, for corresponding European Patent application 09170724.0, noting listed references in this IDS.

European Office action dated May 25, 2011, for corresponding European Patent application 09170724.0, 5 pages.

Patent Abstracts of Japan, and English machine translation of Japanese Publication 2003-100324, 20 pages.

Patent Abstracts of Japan, and English machine translation of Japanese Publication 08-007911 (20 pages).

Patent Abstracts of Japan, and English machine translation of Japanese Publication 2006-185750 (28 pages).

Patent Abstracts of Japan, and English machine translation of Japanese Publication 2006-318808 (10 pages).

SIPO Office action dated May 18, 2012, for corresponding Chinese Patent application 200910171911.X, with English translation, (14 pages).

European Office action dated Sep. 4, 2012, for corresponding European Patent application 09170724.0, (4 pages).

EPO Examination Report dated Feb. 3, 2014, for corresponding European Patent Application No. 09170724, (4 pages).

SIPO Office action dated Jan. 23, 2013 for corresponding CN application No. 200910171911.X (9 pages) with English translation (13 pages).

\* cited by examiner

FUEL CELL SYSTEM AND DRIVING METHOD THEREOF

CROSS-REFERENCE TO RELATED APPLICATION

This application claims priority to and the benefit of U.S. Provisional Application Ser. No. 61/119,670 filed on Dec. 3, 2008 and titled FUEL CELL SYSTEM AND DRIVING METHOD THEREOF, the entire content of which is incorporated herein by reference.

BACKGROUND OF THE INVENTION (a) Field of the Invention

The present invention relates to fuel cell systems and driving methods thereof. More particularly, the present invention relates to a fuel cell system for reducing a cathode catalyst, and easily removing reactants and non-reactants created inside the fuel cell.

(b) Description of the Related Art

A fuel cell is a device that electrochemically generates electric power using fuel (e.g., hydrogen or reformed gas) and an oxidizer (e.g., oxygen or air). That is, the fuel cell constantly receives fuel (e.g., hydrogen or reformed gas) and an oxidizer (e.g., oxygen or air) from an external device, and transforms the fuel and oxidizer directly to electrical energy through an electrochemical reaction.

Pure oxygen, or oxygen-rich air (i.e., air containing a large amount of oxygen), is used as the oxidizer of the fuel cell, and pure hydrogen, or a hydrogen-rich fuel (i.e., a fuel containing a large amount of hydrogen), is used as the fuel. The hydrogen-rich fuel may be a fuel produced by reforming a carbonized hydrogen fuel, such as liquefied natural gas (LNG), liquefied petroleum gas (LPG), and $CH_3OH$.

A polymer electrolyte membrane fuel cell (PEMFC) is one example of a fuel cell system. The PEMFC has high output density and high energy transformation efficiency, and is operable at low temperatures, for example below 80° C. Also, the PEMFC is down-sizable, closeable, and sealable. Therefore, the PEMFC can generally be used as a power source in many fields, for example electromobiles, home power generators, mobile communication equipment, military equipment, and medical equipment.

A PEMFC includes a reformer for generating a reformed gas containing a large amount of hydrogen from a fuel, and a fuel cell stack for generating electric power from the reformed gas. The fuel cell stack receives oxygen and the reformed gas and generates electric power through the reaction of the oxygen and the hydrogen.

The PEMFC is driven at a high driving voltage, enabling reduction in the use of fuel, resulting in high driving efficiency. However, the high voltage driving of PEMFC causes the cathode in the fuel cell stack to be oxidized, thereby deteriorating cathode catalyst activation. Carbon-supported platinum catalysts (i.e., platinum particles supported in carbon particles) are generally used as the cathode catalysts in the cathodes of fuel cell stacks. When an oxidizer is supplied to the fuel cell stack, an oxide film is formed on the cathode catalyst. This oxide film deteriorates catalyst activation, and the oxidizer causes the carbon particles to oxidize while driving.

Also, non-reactants are generated during reaction. If the non-reactants are not removed, the non-reactants block channels of the stack. As a result, flooding problems may arise. Flooding problems are the major cause of decreases in the life-spans of fuel cell stacks.

The above information disclosed in this Background section is presented to enhance understanding of the invention, and therefore may contain information that does not form part of the prior art known to those of ordinary skill in the art.

SUMMARY OF THE INVENTION

According to embodiments of the present invention, fuel cell systems and driving methods thereof achieve improved life-span by simultaneously suppressing deterioration of the fuel cell stack and easily removing non-reactants.

In an exemplary embodiment of the present invention, a method of driving a fuel cell system includes supplying a first amount of an oxidizer (which is an amount less than a normal amount of the oxidizer) to a fuel cell stack while continuously supplying fuel to the fuel cell stack, supplying a second amount of the oxidizer (which is an amount greater than the normal amount of the oxidizer) to the fuel cell stack, and supplying a third amount of the oxidizer (which is the normal amount) to the fuel cell stack. As used herein, "normal amount" of the oxidizer refers to the amount of oxidizer supplied in a normal driving state, which may vary depending on the type of fuel cell employed and its capacity (as is known in the art).

While supplying the first amount of oxidizer, the voltage of the fuel cell stack may be dropped to a reduction voltage that forms a reduction atmosphere inside the cathode. The reduction voltage may be from about 0.5V to 0.0V.

The first amount of oxidizer supplied to the fuel cell stack may be from about 75% to about 85% of the third amount (i.e., the normal amount). The first amount of oxidizer may be supplied for a period of time from about 2 to about 5 seconds. The second amount of oxidizer may be from about 120% to about 150% of the third amount. The second amount of oxidizer may be supplied for a period of time from about 2 to about 5 seconds. In supplying the second amount of oxidizer, non-reactants and reactants remaining in the fuel cell stack may be removed.

The fuel cell system may further include an oxidizer pump or an oxidizer control valve for controlling the supply of the oxidizer.

According to another exemplary embodiment of the present invention, a fuel cell system includes a membrane electrode assembly, a fuel cell stack, a fuel supply unit, an oxidizer supply unit, and a controller. The membrane electrode assembly includes an electrolyte membrane, a cathode at one side of the electrolyte membrane, and an anode at the other side of the electrolyte membrane. The fuel cell stack includes a plurality of electric power generators having separators at both sides of the membrane electrode assembly. The fuel supply unit supplies fuel to the fuel cell stack, and the oxidizer supply unit supplies oxidizer to the fuel cell stack. The controller controls the constituent elements of the fuel cell system to sequentially deliver a first amount of the oxidizer to the fuel cell stack, deliver a second amount of the oxidizer to the fuel cell stack, and supply a third amount of oxidizer to the fuel cell stack. The first amount of oxidizer is an amount of oxidizer less than a normal amount of oxidizer, the second amount of oxidizer is an amount greater than a normal amount of oxidizer, and the third amount of oxidizer is the normal amount of oxidizer. As noted above, "normal amount" of the oxidizer refers to the amount of oxidizer supplied in a normal driving state.

The controller may deliver a first amount of oxidizer to the fuel cell stack of from about 75% to about 85% of the third (normal) amount and may drop the voltage of the fuel cell stack to a reduced voltage, thereby forming a reduction atmosphere inside the cathode. The reduced voltage may be from about 0.5V to about 0.0V. The controller may deliver a second amount of oxidizer to the fuel cell stack of from about 120% to about 150% of the third (normal) amount.

The fuel cell system may further include an oxidizer pump or an oxidizer control valve in communication with the controller for controlling the amount of oxidizer supplied to the fuel cell stack.

According to embodiments of the present invention, reducing the oxidized cathode catalyst by decreasing the oxidizer supply to form a reduction atmosphere significantly prevents deterioration of the fuel cell stack. Also, subsequently increasing the oxidizer supply enables easy removal of reactants and non-reactants remaining inside the fuel cell stack.

DETAILED DESCRIPTION OF THE EMBODIMENTS

The present invention will now be described with reference to the accompanying drawings, in which exemplary embodiments of the invention are shown. As those skilled in the art would realize, the illustrated and described embodiments may be modified in various different ways without departing from the spirit or scope of the present invention.

Figure 1:
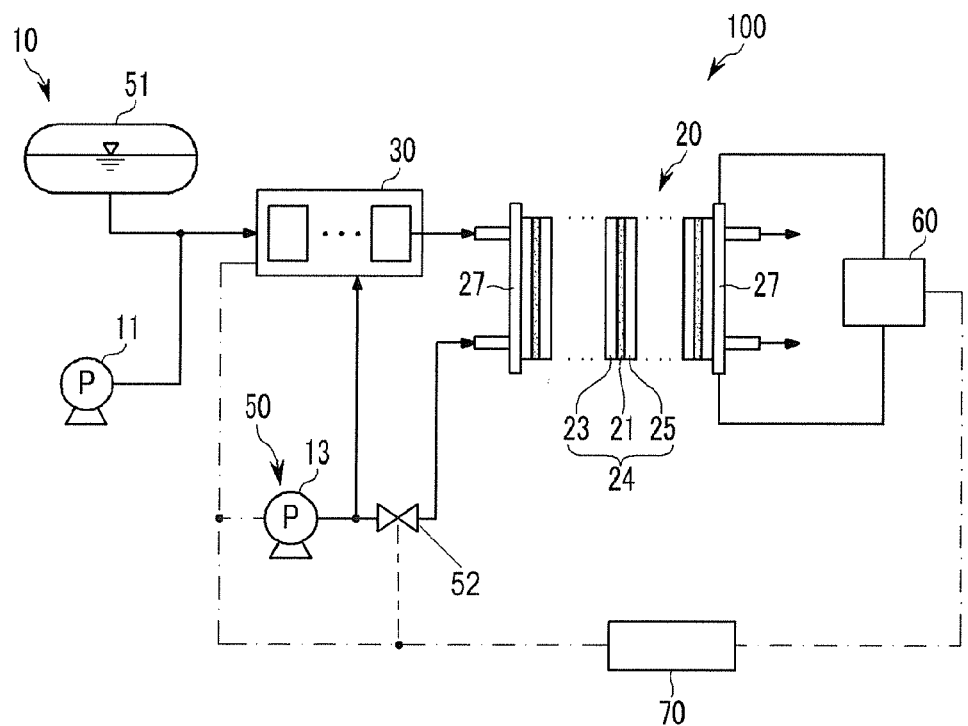
FIG. 1 is a schematic diagram of a fuel cell system according to an embodiment of the present invention.

FIG. 1 is a schematic diagram of a fuel cell system according to an exemplary embodiment of the present invention. Referring to the drawings, the fuel cell system 100 may employ a polymer electrode membrane fuel cell (PEMFC) that generates hydrogen by reforming fuel and generating electrical energy by electromechanically reacting hydrogen and oxygen. However, it is understood that any suitable fuel cell may be used, and the present invention is not limited to PEMFCs. For example, the fuel cell systems may employ liquid fuels or gaseous fuels containing hydrogen, for example methanol, ethanol, liquefied petroleum gas (LPG), liquefied natural gas (LNG), gasoline, and butane gas. Non-limiting examples of suitable alternative fuel cells include direct oxidation fuel cells (DOFCs), in which the fuel cell stack 20 generates electrical energy by directly reacting oxygen with a liquid fuel or gaseous fuel using a power generator. One exemplary DOFC is a direct methanol fuel cell in which methanol is directly reacted with oxygen to generate the electrical energy.

The fuel used for the fuel cell system 100 may be liquid or gaseous carbon hydrogen fuel, for example methanol, ethanol, natural gas, and LPG. As the oxidizer which reacts with the hydrogen, the fuel cell system 100 may use oxygen gas stored in an oxidizer storage unit, or air.

In one embodiment, the fuel cell system 100 includes a reformer 30 for generating a reformed gas from a fuel, a fuel cell stack 20 connected to the reformer 30 for generating electric power from the reaction of the reformed gas and an oxidizer, a fuel supply unit 10 for supplying fuel to the reformer 30, and an oxidizer supply unit 50 for supplying the oxidizer to the fuel cell stack 20.

The reformer 30 reforms liquid fuel to hydrogen gas through a reforming reaction. The fuel cell stack 20 uses the reformed hydrogen gas to generate electric power. Also, the reformer 30 decreases the concentration of carbon monoxide contained in the hydrogen gas.

The reformer 30 includes a reforming unit for generating hydrogen gas by reforming liquid fuel, and a carbon monoxide reducer for decreasing the concentration of carbon monoxide in the hydrogen gas. The reforming unit converts the fuel into a hydrogen-rich reformed gas (i.e., a reformed gas containing a large amount of hydrogen) through a catalytic reaction such as steam reforming reactions, partial oxidation reactions, and exothermic reactions.

The carbon monoxide reducer decreases the concentration of carbon monoxide contained in the reformed gas using a catalytic reaction such as a water-gas shift reaction and selective oxidation, or hydrogen purification using a membrane.

In an alternative embodiment, the reformer may be omitted. As noted above, some embodiments of the present invention include fuel cells which do not require reformers. For example, direct oxidation fuel cells need not include a reformer as the fuel need not be reformed and is instead provided directly to the fuel cell stack.

The fuel supply unit 10 is connected to the reformer 30. The fuel supply unit 10 includes a fuel tank 51 for storing liquid fuel and a fuel pump 11 connected to the fuel tank 51. The fuel pump 11 delivers the liquid fuel stored inside the fuel tank 51 with a specified pumping power to the reformer.

The oxidizer supply unit 50 is connected to the fuel cell stack 20 and includes an oxidizer pump 13 that intakes external air and supplies the external air to the fuel cell stack 20 with a specified pumping power. The oxidizer pump 13 may communicate with a controller 70, which controller controls the oxidizer pump 13 to thereby control the supply of oxidizer to the fuel cell stack.

In an alternative embodiment, the fuel cell system may further include an oxidizer control valve 52 between the fuel cell stack 20 and the oxidizer supply unit 50. The oxidizer control valve communicates with the controller 70, which controller controls the oxidizer control valve to thereby control the supply of the oxidizer. In this embodiment, the controller 70 controls the valve and not the oxidizer pump 13. However, in embodiments in which the valve is omitted, the controller controls the oxidizer pump 13 to control the oxidizer supply.

Figure 2:
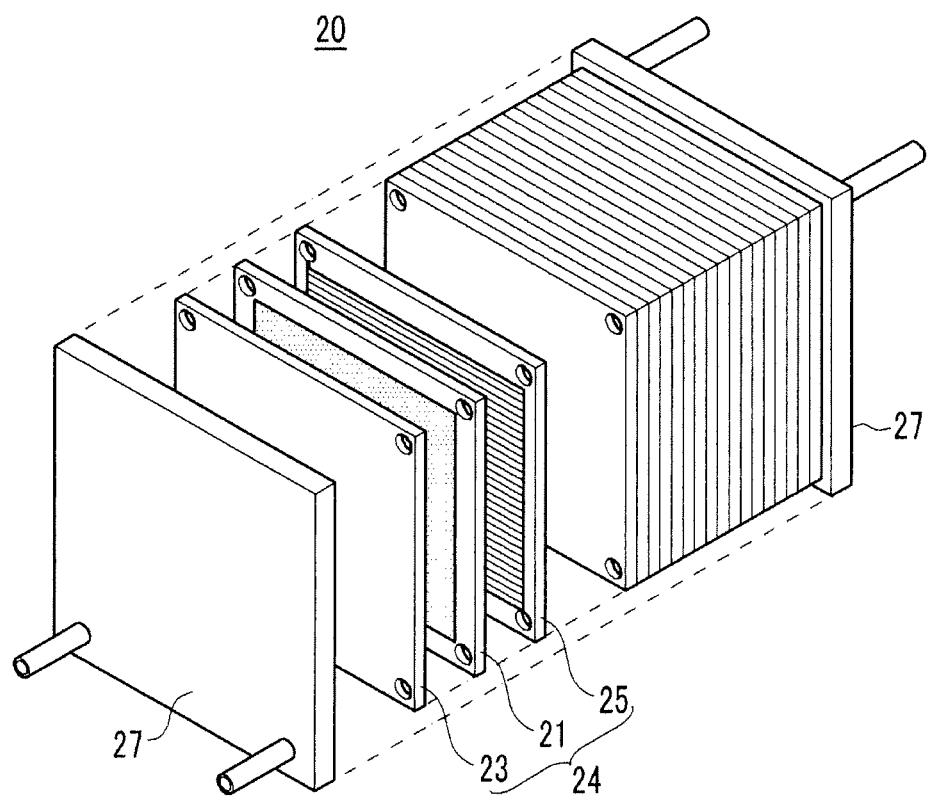
FIG. 2 is an exploded perspective view of the fuel cell stack of FIG. 1.

FIG. 2 is an exploded perspective view of the fuel cell stack of FIG. 1. Referring to FIGS. 1 and 2, the fuel cell stack 20 of the fuel cell system 100 includes a plurality of electric power generators 24 for generating electrical energy by inducing an oxidation-reduction reaction between the reformed gas and the oxidizer. Each of the electric power generators 24 is a unit cell that generates electric power and includes a membrane electrode assembly (MEA) 21 and separators 23 and 25. The MEA oxidizes or reduces oxygen in the fuel and the oxidizer, and the separators 23 and 25 supply the fuel and the oxidizer to the membrane electrode assembly 21. The separators 23 and 25 may also be referred to as bipolar plates.

Each of the electric power generators 24 includes a membrane electrode assembly 21 and separators 23 and 25 at both sides of the membrane electrode assembly 21. The membrane electrode assembly 21 includes an electrolyte membrane at its center, a cathode at one side of the electrolyte membrane, and an anode at the other side of the electrolyte membrane.

In one embodiment of the present invention, the fuel cell stack 20 is formed by sequentially arranging a plurality of electric power generators 24. Here, a separator at the outer most side of the fuel cell stack 20 is referred to as an end plate 27.

As noted above, the fuel cell system 100 further includes a controller 70. The controller 70 is connected to the fuel supply unit 10, the oxidizer supply unit 50, the oxidizer control valve, and the load 60, and controls the overall operations of the fuel cell system 100. As discussed above, the controller 70 either controls the pump 13 within the oxidizer supply unit, or the valve to thereby control the supply of oxidizer.

A load 60 is electrically connected to the fuel cell stack 20 and consumes the electrical energy generated by the fuel cell stack 20. The load 60 may be any of a variety of electric devices, such as a motor of a vehicle, an inverter for transforming direct current (DC) to alternating current (AC), and domestic electric heating equipment.

Figure 3:
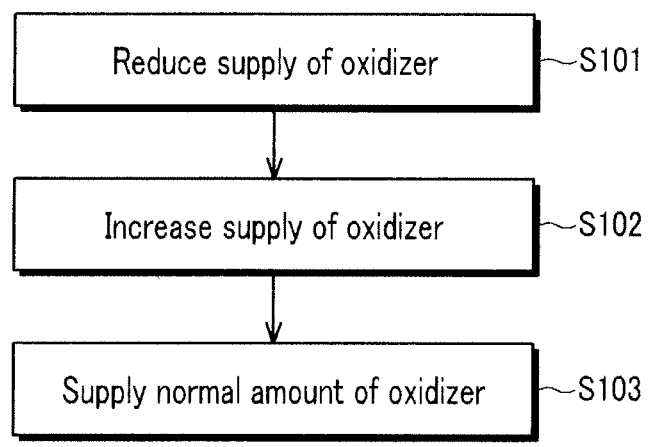
FIG. 3 is a flowchart of a method of driving a fuel cell system according to an embodiment of the present invention.

FIG. 3 is a flowchart of a method of driving a fuel cell system according to an exemplary embodiment of the present invention. Referring to FIG. 3, a method of driving a fuel cell system includes supplying a first amount of an oxidizer (which is less than a normal amount of the oxidizer) to the fuel cell stack while continuously supplying fuel to the fuel cell stack at step S101, thereby reducing the voltage of the fuel cell stack, supplying a second amount of oxidizer (which is greater than the normal amount) to the fuel cell stack at step S102, and supplying a third amount of oxidizer (the normal amount) to the fuel cell stack at step S103. As noted above, the "normal amount" of oxidizer is the amount of oxidizer supplied in an normal driving state, and may vary depending on the type of fuel cell and its capacity.

In supplying the first amount of oxidizer at step S101, a reduced amount of oxidizer is supplied to the fuel cell stack by decreasing the oxidizer supply while continuously supplying fuel during driving of the fuel cell stack. The first amount of oxidizer is from about 75% to about 85% of the third amount (normal amount). If the first amount of oxidizer is less than about 75% of the normal amount, an inverse voltage is applied to the fuel cell stack, and the fuel cell system may deteriorate, or carbon particles may corrode when the normal amount of oxidizer is subsequently supplied. If the first amount of oxidizer is more than about 85% of the normal amount, it may take longer to reduce the voltage of the fuel cell stack 20, it will be difficult to form the reduction atmosphere, and the catalyst may not be stably reduced.

While the supply of oxidizer is reduced to the first amount, the voltage of the fuel cell stack 20 may be reduced to about 0V by controlling a constant-voltage. Here, the voltage of the fuel cell stack 20 is reduced to a reduced voltage that forms a reduction atmosphere inside the cathode. The reduced voltage may be set to from about 0.5V to about 0.0V. When the internal voltage of the fuel cell stack 20 is reduced to the reduction voltage while the supply of oxidizer is reduced, the oxidized catalyst may be reduced in several seconds because the reduction atmosphere is formed in the cathode.

The oxidized platinum Pt catalyst of a cathode undesirably deteriorates activation during driving of the fuel cell system. Therefore, if the reduction atmosphere is formed in the cathode according to embodiments of the present embodiment, catalytic poisoning can be easily and substantially removed by reducing the Pt catalyst.

If the voltage is reduced after decreasing the supply of oxidizer (but not completely cutting off the supply of oxidizer) according to embodiments of the present invention, it is possible to prevent the inverse voltage from being applied to the fuel cell stack 20.

In supplying the second amount of oxidizer at step S102, the amount of oxidizer supplied to the fuel cell stack 20 is increased after reducing the voltage. When the oxidizer supply is increased, non-reactants and reactants may be removed by supplying the second (increased) amount of oxidizer to the fuel cell stack 20. Here, the second amount of oxidizer is greater than the third (normal) amount. The second amount of oxidizer may be from about 120% to about 150% of the third (normal) amount, and may be supplied for a period of time from about 2 to about 5 seconds.

If the second amount of oxidizer is less than about 120% of the third (normal) amount, reacted products may not be properly removed. If the second amount of oxidizer is greater than about 150% of the third (normal) amount, the catalyst may deteriorate due to abrupt oxidization.

When the second amount of oxidizer is supplied after the first amount of oxidizer (i.e., the decreased amount), water and impurities which are generated inside the fuel cell stack by the oxidizer can be easily removed by the excessive amount of oxidizer (i.e., the second amount) supplied under high pressure (i.e., a pressure higher than the pressure under normal driving conditions). Since the supply of oxidizer is not cut off completely, it is possible to prevent carbon particles from oxidizing, which may occur when the oxidizer is cut off and then re-supplied.

In supplying the third (normal) amount of oxidizer to the fuel cell stack 20 at step S103, the fuel cell stack 20 is driven under normal driving conditions by supplying the normal amount of oxidizer to the fuel cell stack 20 after removing impurities with the increased supply of oxidizer. Electrical energy may then be generated under normal driving conditions.

According to embodiments of the present invention, the method of driving the fuel cell system 100 reduces the catalyst by supplying a decreased amount of oxidizer. Also, impurities may be easily and substantially removed by subsequently supplying an increased amount of oxidizer. As a result, deterioration of the fuel cell stack can be substantially prevented, and the life-span of the fuel cell stack improved.

The fuel cell system 100 includes a controller 70 for controlling the constituent elements of the fuel cell system to perform the method of driving the fuel cell system. The controller 70 is connected to the fuel supply unit 10, the oxidizer supply unit 50, the oxidizer control valve 52, and the load 60. The controller 70 controls the constituent elements of the fuel cell system to sequentially supply the first amount of oxidizer (which is less than the normal amount) to the fuel cell stack 20 by reducing the supply of oxidizer to the fuel cell stack 20, reduce the voltage of the fuel cell stack 20, supply the second amount of oxidizer (which is greater than the normal amount) to the fuel cell stack 20, and supply the third (normal) amount of oxidizer to the fuel cell stack.

Also, the controller 70 controls the amount of oxidizer supplied as the first (reduced) amount of oxidizer to the fuel cell stack and the period of time over which the first amount of oxidizer is supplied. The controller 70 also controls the voltage of the fuel cell stack, the extent to which the voltage is reduced and the period of time over which the reduced voltage is applied. In addition, the controller 70 controls the amount of oxidizer supplied as the second (increased) amount of oxidizer to the fuel cell stack and the period of time over which the second amount of oxidizer is supplied in order to reduce the catalyst in the fuel cell stack and remove internal reactants and non-reactants.

The following Examples are presented for illustrative purposes only and do not limit the scope of the invention.

Example 1

A fuel cell system was driven by supplying a first amount of oxidizer to the fuel cell stack, where the first amount of oxidizer was less than the normal amount of oxidizer. The first amount of oxidizer was supplied for about 2 to 3 seconds. Then, a second amount of oxidizer was supplied to the fuel cell stack, where the second amount of oxidizer was greater than the normal amount of oxidizer. The second amount of oxidizer was supplied for about 2 to 3 seconds. Then, a third amount of oxidizer was supplied to the fuel cell stack, where the third amount of oxidizer was the normal amount of oxidizer (i.e., the amount of oxidizer supplied in a normal driving state). The entire driving method was carried over a period of 1 hour.

The fuel cell system driven by the method of Example 1 showed an initial performance of 450 mW/cm$^2$ at 0.65V and 60° C. The humidification rate of the anode was 80%, and the cathode was in a dry state. Also, a ratio of $fuel_{stoic}$ to $oxidizer_{stoic}$ ($fuel_{stoic}$:$oxidizer_{stoic}$) was 1.2:2.5. $Fuel_{stoic}$ is a measure of the amount of fuel supplied to the fuel cell with respect to the minimum amount of fuel needed to generate electricity. Similarly, $oxidizer_{stoic}$ is a measure of the amount of oxidizer supplied to the fuel cell with respect to the minimum amount of oxidizer needed to generate electricity.

Comparative Example 1

A fuel cell system was driven by supplying a normal amount of oxidizer to the fuel cell stack.

Figure 4:
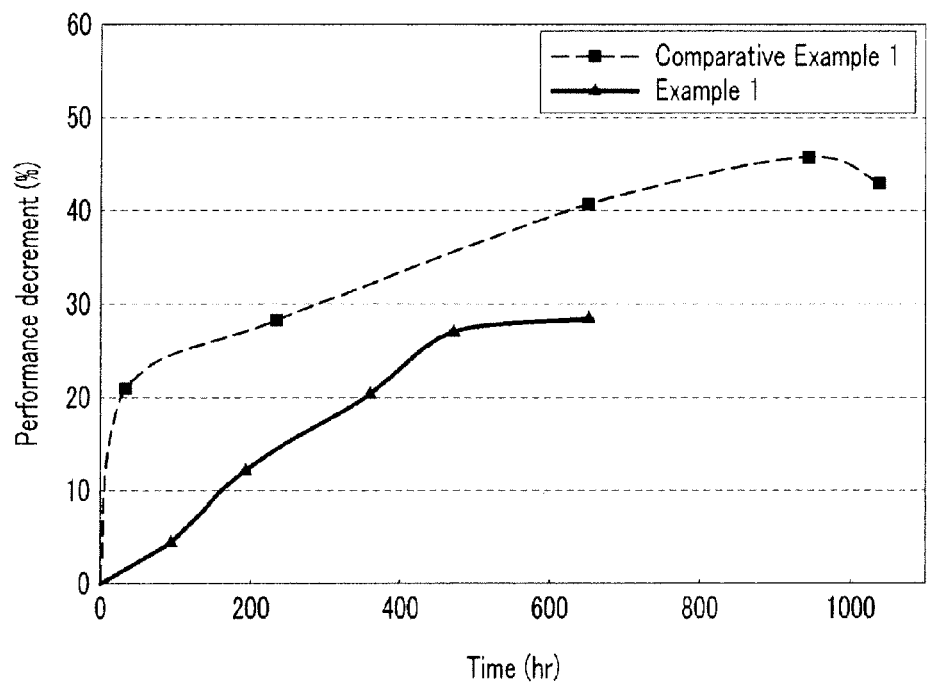
FIG. 4 is a graph comparing the performance of a fuel cell system driven by a method according to Example 1 to the performance of a fuel cell system driven by a method of Comparative Example 1.

FIG. 4 is a graph comparing the performance of the fuel cell system driven by the method according to Example 1 to the performance of the fuel cell system driven by the method of Comparative Example 1. As shown in FIG. 4, the performance of the fuel cell system driven by the method of Comparative Example 1 is significantly poorer than the performance of the fuel cell system driven according to Example 1. In particular, the fuel cell system driven by the method of Example 1 showed significantly less deterioration than that of the fuel cell system driven by the method of Comparative Example 1. Accordingly, the method of Example 1 according to embodiments of the present invention substantially prevent deterioration of the fuel cell stack.

Figure 5:
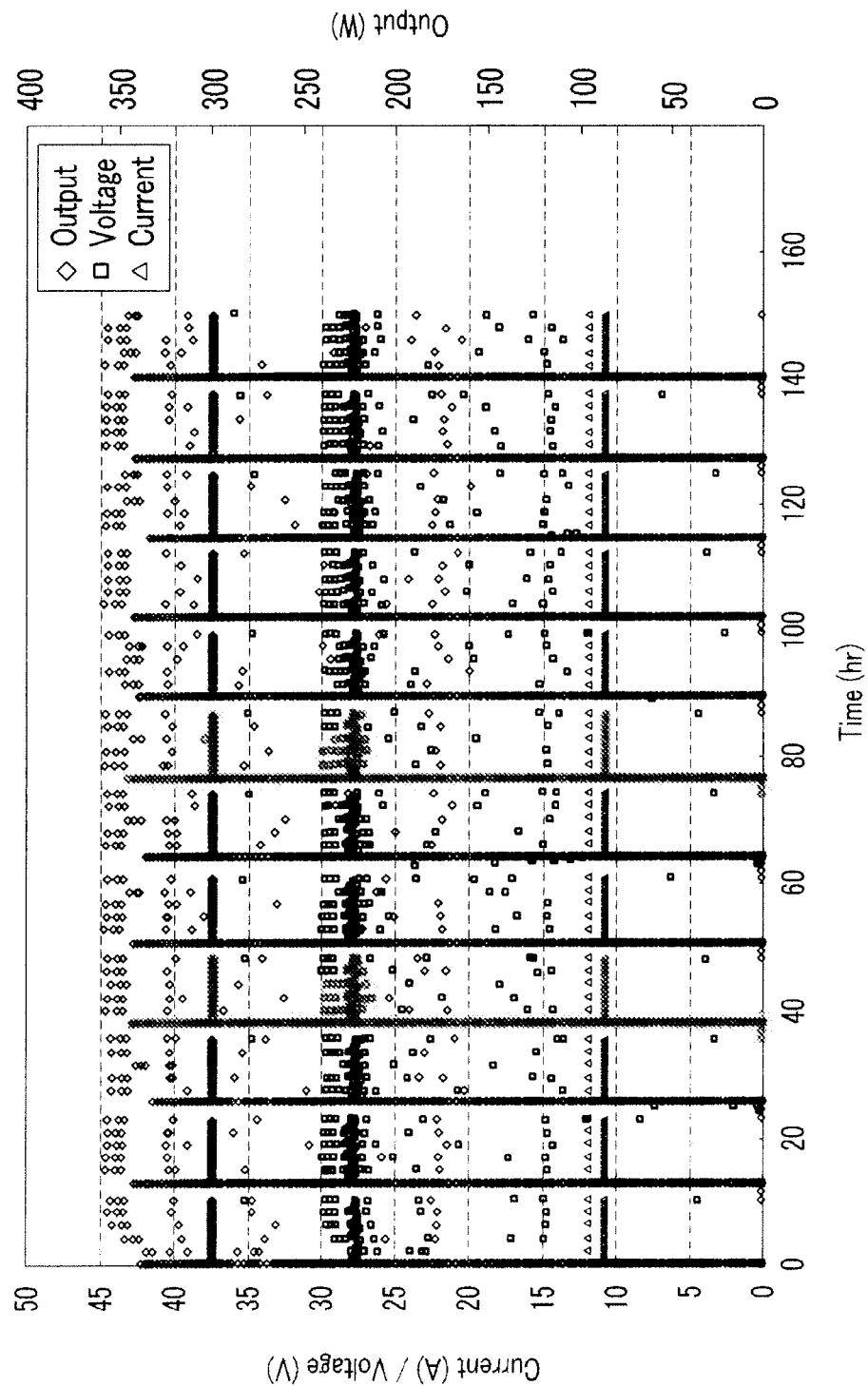
FIG. 5 is a graph of the life-span of a fuel cell stack driven by a method according to Example 1.

FIG. 5 is a graph of the life-span of a fuel cell stack driven by the method of Example 1. The life-span was analyzed after driving the fuel cell stack for a total of 200 hours, including sequences of 10 hours of driving and 2 hours of rest. As shown in FIG. 5, performance of the fuel cell did not deteriorate even though the fuel cell stack was driven for longer than 100 hours.

While this invention has been illustrated and described in connection with certain exemplary embodiments, those of ordinary skill in the art will recognize that various modifications and changes can be made to the described embodiments without departing from the spirit and scope of the present invention as defined in the following claims.

What is claimed is:

1. A fuel cell system, comprising:
a fuel cell stack comprising a plurality of electric power generators, each electric power generator comprising a membrane electrode assembly comprising a cathode including a cathode catalyst and an anode, the cathode and anode separated by an electrolyte membrane and configured to react a fuel with an oxidizer to produce a voltage and to generate electrical energy;
a fuel supply unit configured to supply the fuel to the fuel cell stack;
an oxidizer supply unit configured to supply oxidizer to the fuel cell stack; and
a controller programmed to control the supply of oxidizer to the fuel cell stack from the oxidizer supply, wherein the controller is programmed to sequentially deliver first, second and third flow rates of oxidizer to the fuel cell stack while the fuel supply unit is supplying fuel to the fuel cell stack, wherein the first flow rate of oxidizer is less than the third flow rate of oxidizer, the second flow rate of oxidizer is greater than the third flow rate of oxidizer, and the controller is further programmed to reduce the voltage to between about 0.5V and about 0.0V when the first flow rate of oxidizer is delivered to the fuel cell stack, thereby creating a reducing atmosphere in the cathodes and causing a reduction of oxidized cathode catalyst; and
wherein the first flow rate of oxidizer is from about 75% to about 85% of the third flow rate of oxidizer, the first flow rate being supplied for about 2 to about 5 seconds; and the second flow rate of oxidizer is from about 120% to about 150% of the third flow rate of oxidizer, the second flow rate being supplied for about 2 to about 5 seconds.

2. The fuel cell system according to claim 1, wherein the fuel supply unit further comprises a reformer.

3. The fuel cell system according to claim 1, further comprising an oxidizer control valve through which the oxidizer is supplied from the oxidizer supply unit to the fuel cell stack, wherein the oxidizer control valve opens and closes in response to the controller to thereby control the flow rate of oxidizer supplied to the fuel cell stack.

4. The fuel cell system according to claim 1, further comprising an oxidizer pump through which the oxidizer is supplied from the oxidizer supply unit to the fuel cell stack, wherein the oxidizer pump responds to the controller to thereby control the flow rate of oxidizer supplied to the fuel cell stack.

5. The fuel cell system according to claim 1, further comprising a load connected to the fuel cell stack configured to consume the electrical energy generated by the fuel cell stack.

6. The fuel cell system according to claim 1, further comprising a fuel supply unit configured to supply fuel to the fuel cell stack and a load connected to the fuel cell stack configured to consume the electrical energy generated by the fuel cell stack, wherein the controller is further programmed to control the supply of fuel to the fuel cell stack and to control the supply of electrical energy to the load.

7. A method of driving a fuel cell system, comprising:
providing the fuel cell system comprising a fuel cell stack comprising a plurality of electric power generators, each electric power generator comprising a membrane electrode assembly comprising a cathode including a cathode catalyst and an anode, the cathode and anode separated by an electrolyte membrane;
supplying a fuel to the fuel cell stack;
first supplying a first flow rate of oxidizer to the fuel cell stack and generating a first voltage of the fuel cell stack while supplying fuel to the fuel cell stack thereby creating a reducing atmosphere in the cathodes, thereby causing a reduction of oxidized cathode catalyst;
second supplying a second flow rate of oxidizer to the fuel cell stack while supplying fuel to the fuel cell stack; and
third supplying a third flow rate of oxidizer to the fuel cell stack while supplying the fuel to the fuel cell stack to thereby drive the fuel cell stack and generate a third voltage, wherein the first flow rate of oxidizer is less than the third flow rate of oxidizer, the second flow rate of oxidizer is greater than the third flow rate of oxidizer, and wherein the fuel and oxidizer react in the fuel cell stack to generate electrical energy, wherein the first voltage is lower than the third voltage; and wherein the first flow rate of oxidizer is from about 75% to about 85% of the third flow rate of oxidizer, the first flow rate being supplied for about 2 to about 5 seconds; and the second flow rate of oxidizer is from about 120% to about 150% of the third flow rate of oxidizer, the second flow rate being supplied for about 2 to about 5 seconds.

8. The method according to claim 7, wherein the first voltage of the fuel cell stack is between about 0V and about 0.5V.

* * * * *